United States Patent Office 3,306,811
Patented Feb. 28, 1967

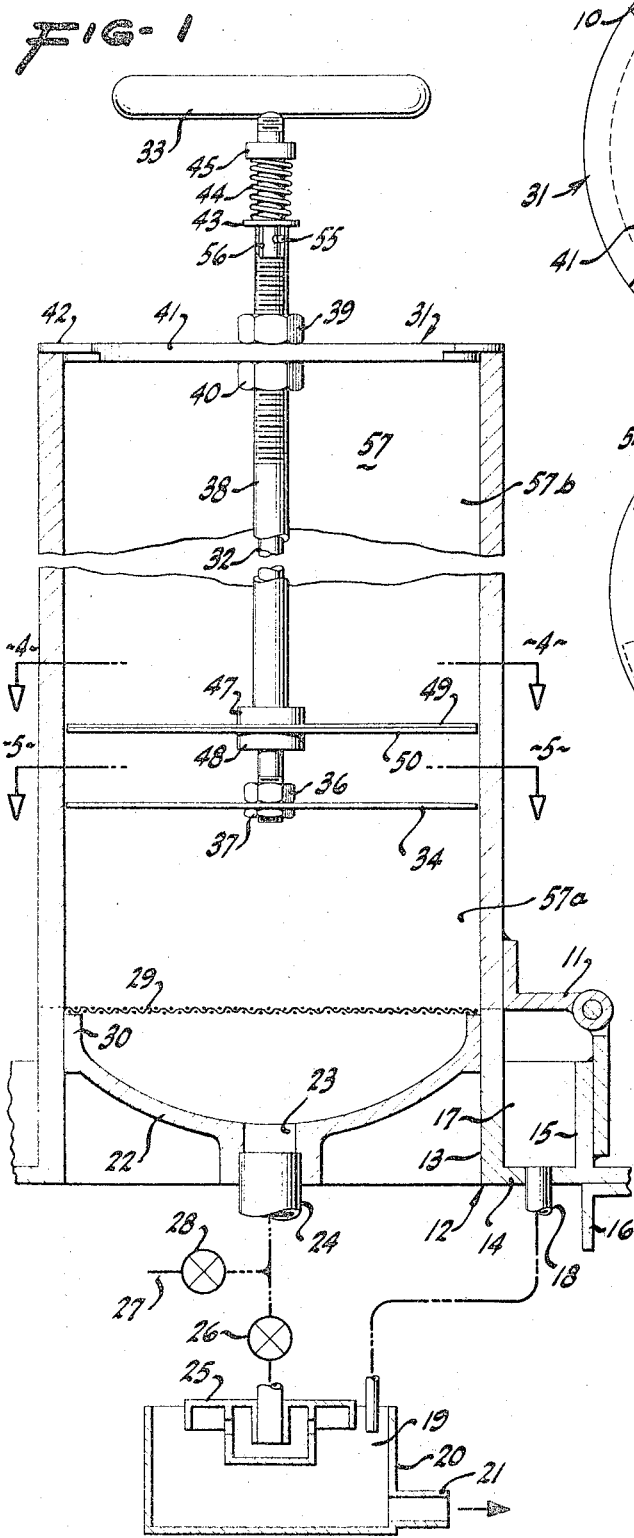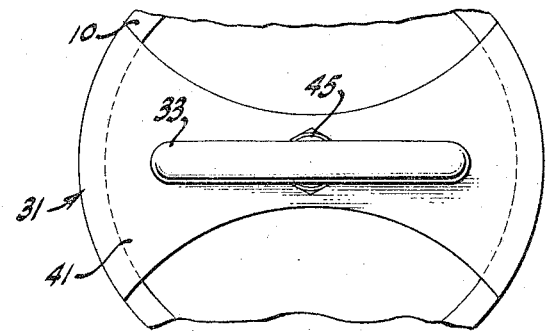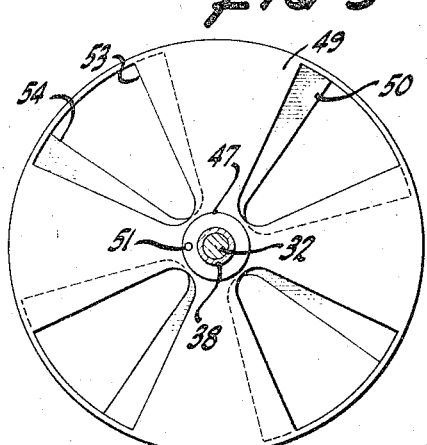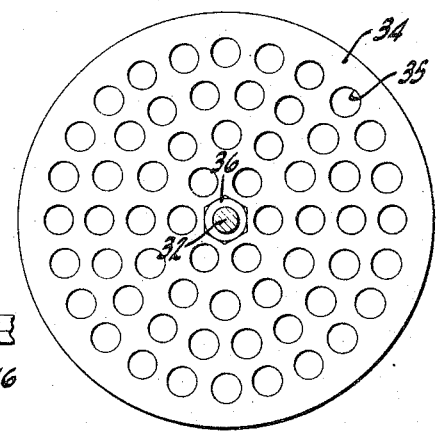
Feb. 28, 1967 G. F. SYLVESTER 3,306,811
METHOD AND APPARATUS FOR FORMING MULTI-LAYER, PAPER TEST SHEETS
Filed April 7, 1964 2 Sheets-Sheet 1
INVENTOR.
GORDON F. SYLVESTER
BY Stanley Bialos
ATTORNEY

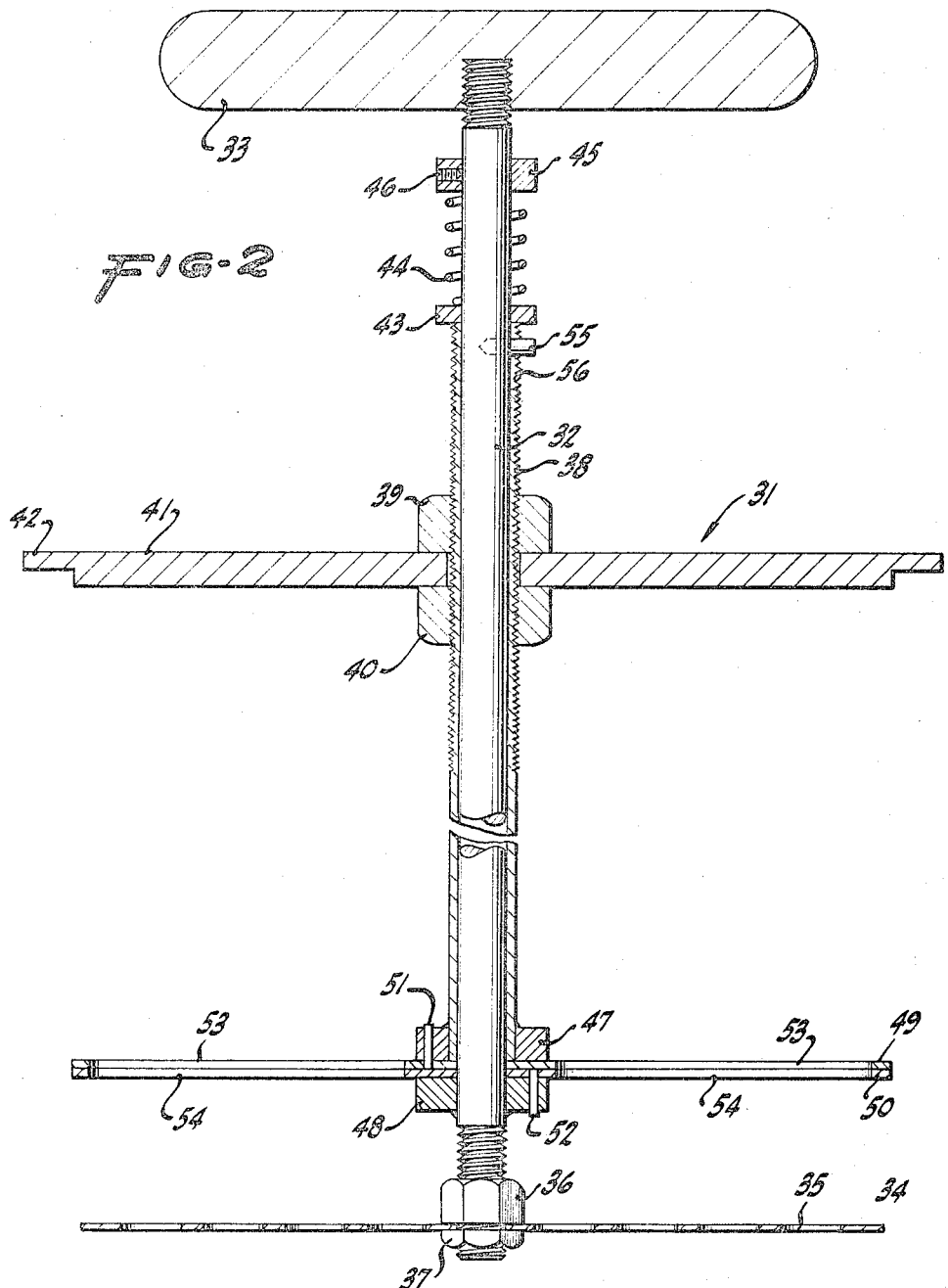

3,306,811
METHOD AND APPARATUS FOR FORMING
MULTI-LAYER, PAPER TEST SHEETS
Gordon F. Sylvester, 191 Mariposa Drive,
Pittsburg, Calif. 94565
Filed Apr. 7, 1964, Ser. No. 358,031
12 Claims. (Cl. 162—123)

This invention relates to a method and apparatus for making laminate test sheets, and it is particularly useful in forming paper test sheets each of which comprises two or more laminations or layers of pulp.

In the paper making industry, it is customary for each mill to produce in the laboratory for test purposes, hand sheets or test samples from the various pulp consignments or from the slurries made therefrom and which are fed to the paper making machine (a Fourdrinier machine, for example). The hand sheets so formed can be used for a variety of test purposes such as for testing the tensile, bursting and tear strengths of the paper, for color matching and for a variety of other tests provided that the hand sheets are a sufficiently close approximation to the paper formed or which will be formed in the mill from the same pulps or pulp slurries.

In this respect, and in order to standardize test procedures so that the results thereof are susceptible to a uniform or common interpretation throughout the paper making industry, the Technical Association for the Pulp and Paper Industry (TAPPI) has specified certain testing practices and techniques which have been accepted generally by the industry. For example, procedures for forming test sheets which are used in determining the optical properties of pulp are described and specified in TAPPI Standard No. T218m; a method for determining the drainage time and drainage factor of pulp (which for many purposes may replace the freeness test) is specified in TAPPI Standard No. T221m; and a precision method of forming test sheets from pulp, before or after beating, for testing the physical properties thereof, is specified in TAPPI Standard No. T205m-58. This latter TAPPI Standard is of particular interest as concerns the present invention, and it may be noted that such standard rigorously specifies the apparatus which must be used, the precise procedure to be followed, and the various parameters which must be observed when forming in the laboratory hand sheets for use in testing the physical properties of pulp or of the paper made therefrom. If the particularized apparatus, procedure and parameters are carefully adopted and followed, the resulting hand sheets and the tests performed thereon will receive general recognition. However, the precision method set forth in such TAPPI Standard is only concerned with making single-laminate test sheets and not with making test sheets generally.

In the past, the primary product produced by the paper industry has been a single-laminate paper. Today, however, multiple-laminate papers are becoming more and more prevalent and while laminated paper webs are produced commercially on machinery and by techniques that are now standard and well accepted, no correspondingly accepted laboratory techniques have been developed for making multiple-laminate test samples or hand sheets. Accordingly, a general purpose of the present invention is to provide a method and apparatus for making laminate test sheets, and in particular multiple-laminate paper hand sheets or test samples from pulp slurry; and a general object of the invention is in the provision of an improved method and apparatus for making multiple-laminate paper test samples wherein the method and apparatus conforms to the afore-mentioned TAPPI-specified apparatus, procedures and techniques, with the result that such test samples may be accepted as standard products in the same way that correspondingly prepared single-laminate test samples are accepted when formed in accordance with the TAPPI Standard No. T205m-58.

In attaining these general objectives, a laminated paper test sample is formed by first placing a pulp slurry in a container having a discharge outlet covered by a collection screen or wire-covered grid plate adapted to filter out and collect thereon fibrous material from the slurry when it is discharged from the container through the outlet thereof. A predetermined quantity of the slurry is then discharged through such outlet whereupon the elevation of the slurry in the container is reduced to a predetermined level and a first fibrous lamination is formed upon the screen. The container is next divided at such elevation of the remaining slurry into first and second compartments which are substantially flow-isolated from each other.

A second quantity of pulp slurry is then placed within the container, and in particular within the second compartment thereof, and at such time is flow-isolated from the quantity of the first slurry still remaining in the container or first compartment thereof. Thereafter, substantially uninhibited flow communication is re-established between the two compartments, and the total or aggregate quantity of slurry then within the container is discharged therefrom through such outlet. As a result, a second fibrous lamination is formed by the collection screen in superposition upon the first lamination. The composite multiple-laminate sheet is then couched from the collection screen and dried in accordance with standard procedures.

Various specific features and advantages of the invention, as well as additional objects thereof, will become apparent as the specification develops.

An embodiment of the invention is illustrated in accompanying drawings in which:

FIGURE 1 is a broken, vertical sectional view of the apparatus employed in making multiple-laminate test samples, portions of the apparatus being illustrated diagrammatically;

FIGURE 2 is an enlarged, broken vertical sectional view of the container-dividing, flow-isolated structure used with the apparatus illustrated in FIGURE 1;

FIGURE 3 is a broken top plan view of the apparatus shown in FIGURE 1;

FIGURE 4 is essentially a transverse sectional view taken along the plane 4—4 of FIGURE 1; and FIGURE 5 is essentially a transverse sectional view taken along the plane 5—5 of FIGURE 1.

To a considerable extent the apparatus illustrated in FIGURE 1 is conventional, conforms to the standards specified by TAPPI in the aforementioned Bulletin No. T205m-58, and is illustrated and described in such bulletin. An example of apparatus accepted and approved by TAPPI, is a sheet machine manufactured in the United States by the Hermann Manufacturing Company of Lancaster, Ohio, which apparatus is sold and distributed by Testing Machines, Inc., of New York City, New York.

The apparatus shown in the drawings comprises a container having an upper section 10 of cylindrical configuration open at both the top and bottom thereof. Adjacent its lower end, the container section 10 is equipped with a hinge structure 11 cooperatively arranged with a base 12. The base 12 has an upwardly extending inner wall 13, a bottom wall 14, and an upwardly extending outer wall 15 coaxially circumjacent the inner wall 13. Such inner wall has essentially the same internal diameter as that of the cylindrical container section 10 which at its lower end is adapted to seat thereon and form a fluid tight seal therewith. For such purpose, the juxtaposed surfaces of the inner wall 13 and cylindrical container section 10 may be finished to close tolerances.

Evidently, the upper container section 10 is selectively swingable in a clockwise direction, as viewed in FIGURE 1, about the pivot axis of the hinge 11 to a position remote from the inner wall 13 of the base 12. Conventional and suitable fastener mechanism is incorporated in the apparatus for releasably securing the upper section 10 and the base 12 in the closed position thereof shown in FIGURE 1; but since such fastener mechanism is standard, it has been omitted from the illustration for purposes of simplifying same.

The base 12 is adapted to be mounted upon a suitable support therefor, such as a bench or table top as indicated in FIGURE 1 by the element 16. The inner wall 13, outer wall 15 and bottom wall 14 together define an annular overflow channel or trough for liquid used in backwashing the apparatus, as will be described hereinafter. Thus, such trough, which is denoted in FIGURE 1 with the numeral 17, is connected through a conduit 18 to the interior 19 of a sump 20, the contents of which are discharged to waste through an outlet 21.

The base 12 has a concave or generally dish-shaped transverse bottom wall 22 extending thereacross which forms the lower end closure for the container. Such bottom wall 22 is welded or otherwise rigidly affixed to the inner wall 13 and it is provided centrally with a discharge outlet 23 in open communication with a pipe or conduit 24 that extends downwardly therefrom and is connected at its lower end to the sump 20 through a discharge or anti-splash structure 25 forming a part thereof. A valve 26 is interposed in the conduit 24 and may be selectively opened and closed to control the discharge of liquid therethrough. A water supply conduit 27 is connected at one end to the conduit 24 through a control valve 28, and at its other end is adapted to be connected to a water tap so as to provide, when desired, a flow of fresh water to the conduit 24 which is used in backwashing the apparatus.

A collection screen or wire-covered grid plate 29 is removably supported by the bottom closure wall 22 and, as shown in FIGURE 1, it includes a wire mesh screen secured to an annular ring 30 which seats upon the upwardly facing outer circumferential edge portion of the closure wall 22. Thus, the collection screen 29 extends completely across the container and over the discharge outlet thereof so that all of the material being discharged from the container through the outlet 23 must flow downwardly through the collection screen 29.

Removably mounted within the container is a container-dividing, compartment-forming or flow-isolating structure generally designated with the numeral 31. The structure 31 comprises, as shown most clearly in FIGURE 2, an elongated rod 32 equipped at its upper end with external threads so as to receive a handle 33 thereon. The rod 32 is similarly equipped with threads at its lower end so as to provide an adjustable mounting for a distribution plate 34 which is of annular configuration and is provided with a plurality of apertures or openings 35 therethrough. The openings 35 may be arranged in concentric circles or annular rings equally spaced from each other with the apertures defining each ring being angularly spaced by equal distances. The distribution plate 34 may be secured to the threaded end of the rod 32 by a pair of nuts 36 and 37.

Coaxially and slidably circumjacent the rod 32 is a hollow sleeve or tube 38 provided with external threads along the upper portion thereof. Received upon such threaded upper end portion are a pair of nuts 39 and 40 which together define fastener structure clamping therebetween, and therefore to the tube, a stabilizing or bearing plate 41 having a stepped outwardly extending lip 42 at the lateral extremities thereof. The precise location of the plate 41 along the sleeve 38 is selectively determined by appropriate manipulation of the nuts 39 and 40; and the plate in association with the nuts and tube forms mounting structure for removably supporting the container-dividing structure relative to the container.

At its upper end, the sleeve 38 is equipped with an outwardly extending flange 43 defining a seat for the lower end portion of a helical spring 44 circumjacent the rod 32. The spring 44 at its upper end seats against a collar 45 carried by the rod 32 and fixedly secured thereto by a set screw 46 or other appropriate means. The spring 44 is operative to resiliently bias the sleeve 38 downwardly relative to the rod 32.

Adjacent its lower end portion, the sleeve 38 carries an outwardly extending annular support or abutment element 47 that may be constrained on the sleeve against relative movement with respect thereto by any appropriate means as, for example, the welding indicated. In a generally similar manner, the rod 32 has a support or abutment element 48 welded or otherwise rigidly affixed thereto and such abutment element has an annular configuration and corresponds dimensionally to the abutment element 47.

Confined between the abutment elements 47 and 48 are a pair of valve plates or discs 49 and 50 that form a disc valve or value structure selectively movable between open and closed positions. The plates 49 and 50 are provided centrally with openings that pass the rod 32 therethrough, and though the openings snugly receive the rod, they permit relatively free movement thereof with respect to the plates (at least with respect to the plate 49) in opposite directions. The plate 49 is ordinarily constrained against rotational or angular displacements relative to the sleeve 38 and abutment element 47 and such constraint may be accomplished through a detent comprising a pin 51 carried by the abutment element 47 and an appropriate aperture provided in the plate 49 which receives the pin therein. Similarly, the plate 50 is constrained against angular displacements relative to the rod 32 by a detent in the form of a fixed pin 52 carried by the abutment element 48 and an aperture in the plate 50 which receives the pin therein.

As shown most clearly in FIGURES 2 and 4, the valve plates 49 and 50 are respectively provided with a plurality of ports 53 and 54 which are symmetrically disposed and in the particular structure illustrated, comprise pie-shaped sectors the center lines of which are angularly spaced by approximately 90 degrees. In that the openings 53 and 54 in such structure are of substantially the same size and configuration, and because the rod 32 and sleeve 38 are rotatable with respect to each other through an angular displacement of approximately 45 degrees, the plates 49 and 50 are angularly displaceable with respect to each other through about 45 degrees so as to shift the respectively associated openings 53 and 54 between a position of substantial coincidence in which the valve is completely open and an alternate position in which the openings are out of register and the valve is completely closed.

Quite evidently, any intermediate or partially open position of the valve may be attained, although in normal use of the apparatus, the valve is selectively moved between the completely open and completely closed position thereof. In order to limit angular displacement of the rod 32 relative to the sleeve 38, the rod is equipped with a stop pin 55 that extends outwardly through an opening 56 provided therefor in the sleeve 38. The opening 56 is dimensioned so that it has an angular width in the order of 45 degrees, whereupon relative rotation of the rod and sleeve is confined to a corresponding arcuate distance.

The plates 49 and 50 are flat planar elements with the facing contiguous surfaces thereof in slidable and substantially sealing engagement. Consequently, when the plates 49 and 50 are rotated so that the openings or ports 53 and 54 are out of register and the valve is closed, a substantial fluid tight seal is defined by the plates so as to effectively prevent the flow of liquid therepassed. Clearly, then, the facing surfaces of the plates are finished to a degree of refinement that provides such flow-isolating engagement therebetween.

One of the functions of the disc valve structure defined by the plates 49 and 50 is to divide the container into two compartments that are essentially flow-isolated from each other. For discriptive convenience, the entire chamber defined within the container is denoted with the numeral 57 in FIGURE 1, and the two compartments formed therein by the valve plates 49 and 50 are respectively denoted with the numerals 57a and 57b. In order to effect such division of the container into two compartments, the outer diameter of the plates 49 and 50 must closely approximate the inner diameter of the cylindrical wall of the container section 10. In a practical embodiment of the structure, a clearance in the order of a few thousandths of an inch has been found adequate to so divide the compartment and still permit insertion and removal of the structure 31.

In that the primary function of the plate 34 is to distribute the slurry relatively uniformly about the entire chamber 57 when the structure 31 is removed therefrom, a somewhat greater clearance may be defined between this plate and the cylindrical walls of the chamber. As concerns the distributive function of the plate 34, the precise orientation and distribution of the openings 35 is not critical but the arrangement disclosed has proven to be quite satisfactory. For informative purposes, and considering a disc having a diameter of approximately 6⅛ inches, each of the apertures 35 may have a diameter of 7/16 of an inch. The various concentric rows of openings may be spaced center to center by ⅝ of an inch along any appropriate diameter of the disc, and a total of 60 apertures may be provided— 24 in the outer row, 18 in the next row, 12 in the following row and 6 in the inner row. Apparently, the apertures in each row are equally spaced.

Again, the precise shape and size of the valve openings 53 and 54 are not considered critical, but a more uniform distribution of the slurry about the chamber 57 is attained if two or more valve openings are provided and if such openings are symmetrically disposed. Four symmetrically orientated openings of the general configuration illustrated have been found to provide satisfactory results. Again, for informative purposes, the inwardly converging edges of the openings 53 may define therebetween an included angle of approximately 42 degrees. In view of the symmetrical disposition of such openings, the angular spacing therebetween is essentially 48 degrees. In this same illustration, the outer arcuate edge of each opening may be spaced from the circumferential edge of the plate 49 by a distance of about ⅛ of an inch, and the radial extent of each opening along a center line thereof may be approximately 2⁷⁄₁₆ inches. In the specific exemplary structure referred to, at least the primary elements of the structure 31 were formed of brass and were chromium plated.

In the use of the apparatus, the upper plate 41 provides a stabilizing or bearing element that maintains the rod 32 and sleeve 38 substantially coincident with the longitudinal axis of the container 10. In this respect, the plate 41 is dimensioned to seat within the container except for the outwardly extending lip 42 which seats upon the upper edge of the container. The precise location of the plate 41 along the length of the sleeve 38 is not particularly critical, and by way of example, in use of the TAPPI-approved container structure referred to hereinbefore which has a height of approximately 15.75 inches from the parting line (defined by the upper edge of the inner wall 13 of the base 12) to the upper edge of the container, the plate 41 may be positioned so that a spacing of approximately 11.5 inches is provided between the upper surface of the valve plate 49 and the upper edge of the container.

Ordinarily, the valve plates 49 and 50 are rotated so that the valve is open whenever the structure 31 is either inserted into or removed from the container, and the valve is closed only during those periods that it is desired to divide the chamber 57 into the two compartments 57a and 57b and flow-isolate such compartments from each other. In opening and closing the disc valve, usually one hand will be placed upon the stabilizer plate 41 to prevent rotation thereof (which necessarily prevents rotation of the sleeve 38) and the handle 33 is gripped with the other hand and rotated through 45 degrees to angularly displace the lower plate 50 relative to the upper plate 49 and thereby either open or close the valve as the case may be.

To form a laminated test sample or hand sheet with the apparatus, the structure 31 is completely removed from the container and the container is secured in the closed position thereof illustrated in FIGURE 1. The valves 26 and 28 are closed and the container is completely empty (the container may have clear liquid therein to the elevation of the collection screen 29 to obviate the occurrence of air being trapped therebeneath). A quantity of pulp slurry is then placed within the container through the open top thereof and, if necessary, liquid (water in the case of a pulp slurry) may be added to the container to provide a slurry at the desired consistency or basis weight. Also, if the test sample is being made in accordance with the procedures specified by TAPPI, the slurry is agitated within the container as by means of a conventional agitator which is reciprocated by hand upwardly and downwardly within the container throughout a specified number of cycles performed in a determinate time interval.

Next, the valve 26 is opened whereupon the slurry residue flows outwardly through the discharge opening 23 and downwardly through the conduit 24 and into the sump 20. The valve is closed before all of the slurry has been drained from the container and, in fact, at substantially the instant that the level of slurry within the container attains some predetermined elevation above the collection screen 29, to maintain the lamination being formed thereon in a wetted condition for reasons noted hereinafter, and adjacent the valve plates 49 and 50. In accordance with the preceding example, such elevation would be approximately 11.5 inches below the upper edge of the container. This discharge of slurry from the container causes the fibrous material forming a part of the slurry to collect along the upper surface of the screen 29, thereby forming the first lamination of the test sample or hand sheet.

Next, the structure 31 is inserted into the container and during such insertion, the disc valve is open so as to permit the ready escape of air which would otherwise tend to be confined and trapped between the upper surface of the pulp slurry and the descending disc valve. The downward movement of the structure 31 is made slow and deliberate so as to minimize disturbance of the slurry which could otherwise be caused by emersion of the distribution plate 34 therein. After the structure 31 is in place with the stabilizing plate 41 firmly seated, the handle 33 is rotated so as to close the disc valve and thereby divide the chamber 57 into the two flow-isolated compartments 57a and 57b which, for convenience of description, may be respectively taken as the first and second compartments.

Thereafter, a second pulp slurry is placed in the container and in particular within the compartment 57b thereof; and by referring to FIGURE 3, it will be noted that the stabilizing plate 41 is appropriately contoured to provide large openings through which the slurry can be flowed into the compartment 57b. The flow of pulp slurry into the second compartment does not disturb the prior pulp slurry contained within the first compartment 57a because of the flow-isolation provided for such first compartment by the disc valve. Ordinarily, the second slurry will be agitated and prepared to the desired consistency before placement thereof in the compartment 57b although agitation, dilution, etc., may be accomplished while the slurry is within the second compartment.

Thereafter, the handle 33 is rotated so as to align the respectively associated ports 53 and 54 and thereby open the disc valve, and then the structure 31 is slowly and deliberately withdrawn from the container. The relatively uniform disposition of the valve openings and of the openings in the disc 34, uniformly distributes the slurry about the container as the structure 31 is withdrawn therefrom, and the large open areas aggregated by the apertures 35 and by the openings 53 and 54 minimize turbulence of the slurry as the structure 31 is withdrawn from the container.

Following removal of the structure 31, the valve 26 is opened to again permit the pulp slurry to drain from the container. If the test sample is to constitute more than two laminations, the slurry is discharged until the level thereof reaches the aforementioned predetermined elevation at which time the valve 26 is closed and the aforedescribed procedure is repeated for each additional lamination. However, if the test sample constitutes only two laminations, the valve 26 is permitted to remain open until all of the slurry then within the container drains therefrom. In either event, discharge of slurry from the container causes the deposit of a second fibrous layer or laminate upon the first laminate.

The upper portion of the container may then be unlatched from the base 12 and swung outwardly about the pivot axis of the hinge 11, whereupon access is thereby afforded to the collection screen 29 and, more particularly, to the fibrous laminates deposited along the upper surface thereof. Such laminates are next couched from the collection screen in the usual and conventional manner, such as described in the aforementioned TAPPI Bulletin No. T205m–58. Thereafter the multiple-laminate test sample may be pressed one or more times, dried and otherwise finished or conditioned in any desired manner which, for example, may adhere to the standard techniques followed in the paper making industry, as described in such TAPPI bulletin.

In order that the test sample consist of a unitary sheet comprising two or more laminations, in contrast to the case in which the laminations are, in effect, each a unitary sheet and are simply stacked one upon another, it has been found that the contiguous fibers of the juxtaposed surfaces of adjacent laminations must be in intimate contact so that an interfiber bond is developed between the adjacent laminations. In order that such bonding be achieved, each layer or lamination must be maintained in such a wetted condition when the next lamination is formed thereon that it has no inherent stability and is flowable to such an extent that confinement thereof is demanded. Therefore, the quantity of slurry located above the collection screen 29 and any lamination or laminations formed thereon provides such wetness during the formation of the subsequent lamination.

Any multiple-laminate test sheet may comprise a plurality of laminations respectively formed from a common slurry, or each lamination of such test sheet may be formed from a different slurry. The precise composition of any particular sample formed in the laboratory will usually depend upon the paper it is intended to duplicate which is being made on the paper machine in the mill. Consequently, the character of such mill paper will determine the composition of the test sheet. Thus, for example, if a mottled-appearance boxboard paper is being made, two separate slurries will be used, the first of which provides the basic, relatively heavy lamination and is, therefore, of relatively high consistency. The second slurry which provides a thin lamination defining the overlay giving the mottled appearance to such board will, therefore, be thin or of low consistency.

A substantial number of sample sheets are usually formed from each test batch of slurry or slurries, and it is usual to flush the collection screen 29 before each test sheet is made. This is accomplished by first opening the container (that is, rotating the upper cylindrical section 10 thereof about the hinge 11) to expose the collection screen. Next, the valve 28 is opened (the valve 26 being closed) which results in fresh water being discharged under pressure upwardly through the opening 23 in the container bottom wall 22. The dish-shaped cavity defined along the upper surface of the bottom wall 22 is thereby caused to fill with water which then flows upwardly through the collection screen 29 to backwash the same. The water flowing upwardly through the screen spills over the upper edge of the wall 13 of the base and into the trough 17 thereof from which it is discharged to waste through the sump 20. The collection screen, including the ring 30 thereof, is removably supported upon the bottom wall 22 and may be lifted therefrom whenever its removal is necessary.

The valve plates 49 and 50 are resiliently urged into contiguous relationship by the helical spring 44, and whenever it is necessary to clean the adjacent faces of the plates, they are readily separated by applying an upwardly directed squeezing force against the seat 43 which displaces the sleeve 38 upwardly against the biasing force of the spring. This upward displacement of the sleeve causes the upper valve plate 53 to move away from the lower valve plate 54 with the result that the adjacent surfaces of the valve plates are exposed and may be thoroughly flushed to clean the same. It may be noted that the maximum upward displacement of the sleeve 38 relative to the rod 32 is limited by the axial length of the slot 56—abutment of the pin 55 with the lower edge of such slot establishing the limit of such upward displacement.

The following may be taken as a specific instance of forming a multiple-laminate test sample in accordance with the present invention:

First, the requisite weight of the test sheet or sample is calculated from the basis weight of the commercial paper being or to be manufactured from the pulp. Considering the case in which the test sample will comprise two different laminations, two slurries of the appropriate stock will be required—one for the primary lamination and another for the secondary lamination. The slurries may be in existence in the mill in which event an appropriate sample quantity is withdrawn from each of the slurries. In this instance, the slurries are usually comprised of a furnish pulp which is necessarily preslushed.

In a common case, however, the slurries are not in existence and the purpose of preparing test samples is to test the physical properties of the pulp which will be used subsequently to make paper. In this event, appropriate pulp samples are drawn from the mill consignments and suitable slurries formed therefrom, in accordance with the procedures specified in TAPPI Standard T205m–58. Accordingly, and considering the case in which the paper is to have a basis weight of 60 grams per square meter with a tolerance of 5%, the weight of the corresponding test sheet of standard dimensions (approximately 6½ inches in diameter) will be in the range of 1.14 to 1.26 grams moisture free.

The weight of the secondary lamination is then determined from the percentage of coverage specified therefor, and the weight thereof is subtracted from the total weight of the test sheet to be formed. As a result, the weight of the primary lamination of the test sheet is then known and a primary slurry is formed which has a fibrous content equal to the weight of the primary lamination (for a finely divided pulp, the usual allowance may be made for fiber loss through the collection screen). For example, if the percentage of coverage specified for the secondary lamination is, say, 20%, the weight of the primary lamination would be between 0.912 to 1.008 grams moisture free, and the weight of the secondary lamination would be between 0.228 and 0.552 gram (using the aforementioned weight range for the test sheet). The secondary slurry is then formed using the amount of pulp by weight necessary to provide a secondary lamination having the calculated weight or percentage of coverage.

The primary lamination is then made as described hereinbefore, and as stated, this may be done precisely in accordance with the procedure set forth in TAPPI Standard No. T205m–58. Generally in accordance with such procedure, the sheet mold comprising the described container is charged with the slurry from which the primary lamination is to be formed after water has been admitted to the container to the elevation of the screen to void any air from therebelow. After agitation of the slurry charge (e.g., six reciprocations of a perforated stirrer within a period of six seconds keeping the stirrer beneath the level of the liquid; followed by a single complete reciprocation within a ten second interval), a pause of ten seconds is observed and the drain valve 26 of the sheet mold is then opened quickly and completely to draw the slurry down to a predetermined elevation (that is, 11½ inches from the top of the container in accordance with the specific exemplary structure considered hereinbefore).

The valve 26 is closed when the level of the liquid is at such predetermined elevation, and a period of substantially three minutes is then observed to let the primary lamination settle along the upper surface of the collection screen 29. After such three minute interval has elapsed, the container-dividing, flow-isolating structure 31 (which for convenience can be referred to as the secondary headbox) with the valve thereof open is inserted into the container and the top wall 41 fitted firmly in seating engagement with the upper edge of the container. At this time, the level of the slurry within the container should be substantially even with the top surface of the upper valve plate 49. The handle 33 is then rotated to close the valve whereupon the upper or second compartment 57b is essentially flow-isolated from the lower or first compartment 57a.

The pre-calculated percentage of the secondary slurry is then prepared in a separate container and the mixture agitated. Usually such preparation of the secondary slurry can be accomplished during the three minute interval in which the primary lamination is settling. The secondary slurry is then poured into the container, and specifically the compartment 57b thereof.

An interval of five seconds is then observed to quiet the slurry and the handle 33 is thereafter rotated to open the disc valve. Next, the secondary headbox unit 31 is carefully and slowly removed from the container and such withdrawal of the unit 31 may be accomplished throughout a period of above five seconds. Following such withdrawal, a ten second interval is observed and then the valve 26 is again quickly and completely opened to permit the contents of the container to drain therefrom, whereupon the fibrous material in the second slurry is removed therefrom and forms a second lamination above the screen 29.

The fibrous material contained in the two slurries is thereby filtered therefrom, and the contiguous fibers of the two laminations are in intimate contact as the laminations are supported along the upper surface of the collection screen 29. The thusly formed multiple-laminate test sheet is then couched from the collection screen 29, pressed and dried in an appropriate manner, such as set forth in TAPPI Standard No. T205m–58.

In this latter respect and as set forth in such Standard, two pieces of customarily used blotting paper are laid over the pulp sheet as it is supported upon the collection screen 29, and the flat brass couch plate is then placed upon the blotters. The brass couch roll is rolled gently over the couch plate in the prescribed manner and thereafter the pulp sheet, blotters and couch plate are removed from the collection screen in a manner similar to that of opening the cover of a book (the pulp sheet will be found to adhere to the contiguous blotter rather than to the collection screen).

The pulp sheet and adjacent blotter are then immediately separated from the second blotter (couch filler) and couch plate. The pulp sheet is then placed upon a press template having a dry blotter thereover; and the template is supported at the time in an appropriate press. A mirror polished plate is placed over the pulp sheet and another blotter is then placed over the polished plate preparatory to receiving another pulp sheet and blotter thereon. Usually a group of at least seven individual test samples are made and the entire group will be pressed at the same time in stacked form within such press, usually to a pressure of 50 p.s.i.g. For such pressing, each succeeding test sheet is supported upon the preceeding polished plate as described.

Following the prescribed pressing of the test sheets, the stack thereof is removed from the press and each of the polished plates with the pulp sheet attached thereto is fitted into a drying ring. The rings are then stacked and clamped and the sheets are dried under standard drying conditions in a humidity-controlled room. After drying, the sheets may be tested in accordance with TAPPI Standard T220m.

A surface application of sizing can be applied with a draw down rod to each of the test sheets after pressing thereof either before or after drying. In the case of heavy sheet weights, a ridge and valley effect can be noted with some stocks or slurries causing a somewhat irregular formation of the secondary lamination. In the case where a better formation of the secondary lamination is desired, it is possible to reverse the described procedure and form the "secondary" lamination first with the "primary" or main lamination being formed on top of such other lamination. Otherwise the procedure is the same as described.

Internal sizing, color matching, dye setting, bending quality, strength characteristics, as well as many other tests common to the paper industry can be carried out on multiple-laminate test samples made in accordance with the procedures set forth.

While in the foregoing specification an embodiment of the invention has been set forth in considerable detail both as respects the method and apparatus features thereof, it will be apparent to those skilled in the art that changes may be made in such details without departing from the spirit and principles of the invention.

What is claimed is:

1. In a method of making laminated paper test sheets, the steps of filtering a pulp slurry through a relatively flat filter medium to collect a layer thereon of solid materials from said slurry to form one lamination of such sheet, forming a second lamination in super-position along said first lamination by flowing additional pulp slurry through such filter medium and through said first lamination thereon while maintaining said first lamination in a wetted condition prior to and during the flow of said additional slurry therethrough and while also confining such first laminatoin to prevent lateral flow thereof, and removing from such filter medium the composite laminations comprising said multiple-laminate sheet preparatory to drying the same.

2. A container-dividing structure of the character described for use with container-equipped mold apparatus in making multiple-laminate paper test sheets, comprising a pair of plates defining a disc valve and being respectively provided with a plurality of valve ports selectively movable into and out of alignment for opening and closing said valve, structure supporting said plates for relative movement between such open and closed positions of said valve, means for effecting relative movement of said plates for selectively opening and closing said valve, and mounting structure carried by said container-dividing structure for removably supporting the same with respect to such container with said valve disposed within the interior thereof.

3. The container-dividing structure of claim 2 and further comprising a perforate distribution disc disposed below and in substantially parallel relation with said valve.

4. A container-dividing structure of the character described for use with container-equipped mold apparatus in making multiple-laminate paper test sheets, comprising an elongated rod and an elongated tube telescopically receiving said rod therein, a pair of discs defining a disc value and being respectively carried by said rod and tube in substantially contiguous juxtaposition for relative angular displacement, said discs being respectively provided with a plurality of valve ports and being selectively movable between a position in which said ports are in alignment and said disc valve is open and a position in which said ports are in complete misalignment and said disc valve is closed, means operatively connected with said rod and tube for angularly displacing the same with respect to each other to selectively open and close said disc valve, resilient means operative between said rod and tube to bias said discs into the aforesaid position of contiguous juxtaposition, mounting structure carried by said tube for removably supporting said container-dividing structure relative to such container with said disc valve disposed within the interior thereof, and a perforate distribution disc carried by said rod beneath said disc valve and in substantially parallel relation therewith.

5. The container-dividing structure of claim 4 in which said valve ports are symmetrically disposed, and in which the perforations defined by said perforate disc are relatively uniformly distributed thereabout.

6. In apparatus for making multiple-laminate paper test sheets and the like, a container defining a chamber therein and being provided adjacent an end portion thereof with a discharge outlet, a collection screen disposed within said chamber above said discharge outlet so that substantially all of the fluid contained within said chamber flows through said screen in discharging through said outlet, and a container-dividing structure comprising an elongated rod and an elongated tube telescopically receiving said rod therein, a pair of discs forming a disc valve structure and being respectively carried by said rod and tube in substantially contiguous juxtaposition for relative angular displacements, said discs being respectively provided with a plurality of valve ports and being selectively movable between a position in which said ports are in alignment and said disc valve structure is open and a position in which said ports are in complete misalignment and said disc valve structure is closed, means operatively connected with said rod and tube for angularly displacing the same with respect to each other to selectively open and close said disc valve structure, mounting structure for removably supporting said container-dividing structure relative to said container with said disc valve structure disposed within the interior thereof, and a perforate distribution disc carried by said rod beneath said disc valve structure and in substantially parallel relation therewith.

7. In apparatus for making multiple-laminated sheets, a container defining a chamber and being provided with a valve-equipped discharge outlet, a collection screen within said chamber and being disposed with respect to said discharge outlet so that substantially all of the fluid contained within said chamber flows through said screen in being discharged from said outlet, container-dividing structure including valve structure located intermediate the ends of said container on the side of said screen opposite said discharge outlet, said valve structure being effective to divide said chamber into two compartments and being selectively movable between open and closed positions to substantially flow-isolate such two compartments when in the closed position, and means for moving said valve structure between its open and closed positions.

8. The apparatus of claim 7 in which said container-dividing structure is removably supported with respect to said container.

9. The apparatus of claim 7 in which mounting structure is provided by said container-dividing structure for adjustably supporting said valve structure within said container for adjusting movements with respect thereto for selectively determining the position at which said valve structure effects the aforesaid division of said chamber into two compartments.

10. The apparatus of claim 7 in which said means for moving said valve structure between open and closed positions is located exteriorly of said container.

11. In apparatus for making multiple-laminate paper test sheets and the like, a container defining a chamber therein and being provided with a valve-equipped discharge outlet, a collection screen within said chamber and being disposed with respect to said discharge outlet so that substantially all of the fluid contained within said chamber flows through said screen in being discharged from said outlet, container-dividing structure including valve structure selectively movable between open and closed positions, mounting means removably supporting said container-dividing structure with respect to said container with said valve structure being located intermediate the ends thereof and on the side of said screen opposite said discharge outlet, said valve structure being effective to divide said chamber into two compartments substantially flow-isolated from each other when said valve structure is in the closed position thereof, and means located exteriorly of said container for moving said valve structure between its open and closed positions.

12. The apparatus of claim 11 and further comprising a perforate distribution element carried by said container-dividing structure for distributing fluid within said container relatively uniformly about said chamber when said container-dividing structure is removed from said container.

References Cited by the Examiner

UNITED STATES PATENTS

| 1,995,586 | 3/1935 | Schopper et al. | 162—218 X |
| 2,723,600 | 11/1955 | Kyle | 162—219 |

FOREIGN PATENTS

| 746,578 | 3/1933 | France. |
| 897,270 | 5/1944 | France. |
| 243,972 | 2/1912 | Germany. |
| 495,841 | 11/1930 | Germany. |
| 828,479 | 1/1952 | Germany. |

DONALL H. SYLVESTER, *Primary Examiner.*

S. LEON BASHORE, *Examiner.*